US006814097B2

(12) United States Patent
Girouard (10) Patent No.: US 6,814,097 B2
(45) Date of Patent: Nov. 9, 2004

(54) PRESSURE RELIEF DEVICE

(75) Inventor: Erick Girouard, Guelph (CA)

(73) Assignee: Teleflex GFI Control Systems L.P., Ontario (CA)

( * ) Notice: Subject to any disclaimer, the term of this patent is extended or adjusted under 35 U.S.C. 154(b) by 172 days.

(21) Appl. No.: 10/141,974

(22) Filed: May 10, 2002

(65) Prior Publication Data

US 2002/0166584 A1 Nov. 14, 2002

Related U.S. Application Data

(63) Continuation of application No. PCT/CA02/00372, filed on Mar. 20, 2002.
(60) Provisional application No. 60/317,466, filed on Sep. 7, 2001.

(30) Foreign Application Priority Data

Mar. 20, 2001 (CA) ............................................. 2341334

(51) Int. Cl.$^7$ ............................................... F16K 17/38
(52) U.S. Cl. ......................... 137/72; 137/79; 220/89.4
(58) Field of Search ..................... 137/72, 79; 220/89.4

(56) References Cited

U.S. PATENT DOCUMENTS

| 47,076 A | 3/1865 | Smith |
| 195,367 A | 9/1877 | Hiller |
| 1,211,173 A | 1/1917 | King |
| 1,303,248 A | 5/1919 | Breidenbach |
| 1,528,303 A | 3/1925 | Rockwell |
| 1,636,065 A | 7/1927 | Mueller et al. |
| 1,781,027 A | 11/1930 | Mapes |
| 1,876,938 A | 9/1932 | Horne |
| 1,944,518 A | 1/1934 | Lovekin et al. |
| 1,960,272 A | 5/1934 | Lovekin |
| 1,984,375 A | 12/1934 | Johnston |
| 2,020,075 A | 11/1935 | Meagher |
| 2,040,776 A | 5/1936 | Marvin |
| 2,133,461 A | 10/1938 | McAbee |
| 2,194,541 A | 3/1940 | Buttner |

(List continued on next page.)

FOREIGN PATENT DOCUMENTS

| FR | 2 780 477 A | 12/1999 |
| GB | 367731 | 9/1931 |
| GB | 504257 | 9/1938 |
| GB | 715109 | 9/1959 |
| GB | 1 068 645 | 5/1967 |
| GB | 2265439 | 9/1993 |
| JP | 62-37700 | 5/1987 |
| SE | 93165 | 6/1938 |
| SU | 582896 | 12/1977 |
| WO | PCT/CA02/00372-I.S R | 9/2002 |

*Primary Examiner*—John Rivell (57) ABSTRACT

A pressure relief device comprising a body including an exterior surface, a cavity, an inlet, an outlet, and an aperture, each of the inlet, the outlet, and the aperture opening into the cavity, a temperature sensitive bonding element and a valve, disposed within the cavity and extending through the aperture, including a sealing member and a cap, the cap being joined to the exterior of the body by the temperature sensitive bonding element, and the sealing member being configured to seal the inlet when the cap is joined to the exterior surface of the body. The pressure relief device as claimed in claim 16, wherein the body further includes a retainer configured to prevent the valve from separating from the body when the cap becomes disengaged from the body. A pressure relief device comprising a body including an exterior surface, a cavity, an inlet, and an outlet, each of the inlet and the outlet opening into the cavity, a temperature sensitive bonding element, a valve, disposed within the cavity, including a valve retainer and a sealing member, the valve retainer being coupled to the sealing member, the valve retainer being joined to the body by the temperature sensitive bonding element, and the sealing member being biased into a sealing relationship with the inlet.

22 Claims, 11 Drawing Sheets

U.S. PATENT DOCUMENTS

| | | | |
|---|---|---|---|
| 2,230,323 A | 2/1941 | Guyton |
| 2,356,283 A | 8/1944 | Steins |
| 2,580,426 A | 1/1952 | Heigis |
| 2,671,461 A | 3/1954 | Hebert |
| 2,697,915 A | 12/1954 | Chisholm |
| 2,743,036 A | 4/1956 | Wachtell |
| 3,001,536 A | 9/1961 | Casey |
| 3,008,479 A | 11/1961 | Mancusi, Jr. |
| 3,010,520 A | 11/1961 | Seaberg |
| 3,040,764 A | 6/1962 | Feinberg |
| 3,101,188 A | 8/1963 | Newmiller et al. |
| 3,101,733 A | 8/1963 | Lord |
| 3,255,824 A | 6/1966 | Rodgers |
| 3,263,929 A | 8/1966 | Seablom |
| 3,472,427 A | 10/1969 | Schaefer |
| 3,491,783 A | 1/1970 | Linsalato |
| 3,554,227 A | 1/1971 | Yocum |
| 3,559,668 A | 2/1971 | Crossman |
| 3,618,627 A | 11/1971 | Wagner |
| 3,623,929 A | 11/1971 | Wannamaker et al. |
| 3,633,596 A | 1/1972 | Gerber |
| 3,730,204 A | 5/1973 | Bissett |
| 3,791,450 A | 2/1974 | Poitras |
| 3,811,457 A | 5/1974 | Crossman |
| 3,827,449 A | 8/1974 | Gurizzan et al. |
| 3,842,853 A | 10/1974 | Kelly et al. |
| 3,896,835 A | 7/1975 | Wicke |
| 3,906,976 A | 9/1975 | Nohr et al. |
| 3,996,992 A | 12/1976 | Johnson |
| 4,006,780 A | 2/1977 | Zehr |
| 4,059,125 A | 11/1977 | Sugimura et al. |
| 4,064,890 A | 12/1977 | Collins et al. |
| 4,083,187 A | 4/1978 | Nagashima |
| 4,085,860 A | 4/1978 | Hawkins et al. |
| 4,195,745 A | 4/1980 | Roberts et al. |
| 4,197,966 A | 4/1980 | Wadensten et al. |
| 4,221,231 A | 9/1980 | Harvey et al. |
| 4,228,858 A | 10/1980 | Sclafani |
| 4,335,734 A | 6/1982 | Trinkwalder |
| 4,352,365 A | 10/1982 | Boccardo et al. |
| 4,365,643 A | 12/1982 | Masclet et al. |
| 4,403,627 A | 9/1983 | Bradley |
| 4,407,432 A | 10/1983 | Shichman |
| 4,430,392 A | 2/1984 | Kelley et al. |
| 4,431,716 A | 2/1984 | Eppley et al. |
| 4,503,675 A | 3/1985 | Gardner et al. |
| 4,506,423 A | 3/1985 | Nakamura et al. |
| 4,533,589 A | 8/1985 | Sewell |
| 4,609,005 A | 9/1986 | Upchurch |
| 4,732,188 A | 3/1988 | Gabrlik et al. |
| 4,744,382 A | 5/1988 | Visnic et al. |
| 4,744,383 A | 5/1988 | Visnic et al. |
| 4,800,948 A | 1/1989 | Visnic |
| 4,896,690 A | 1/1990 | Taylor |
| 4,922,944 A | 5/1990 | Mueller et al. |
| 5,048,554 A | 9/1991 | Kremer |
| 5,161,738 A | 11/1992 | Wass |
| 5,197,671 A | 3/1993 | Wass et al. |
| 5,213,128 A | 5/1993 | Baird |
| 5,223,347 A | 6/1993 | Lhymn et al. |
| 5,255,809 A | 10/1993 | Ervin et al. |
| 5,400,817 A | 3/1995 | Voss et al. |
| 5,435,333 A | * 7/1995 | Duvall ..................... 137/73 |
| 5,495,865 A | 3/1996 | Wass et al. |
| 5,511,576 A | 4/1996 | Borland |
| 5,632,297 A | 5/1997 | Sciullo et al. |
| 5,647,390 A | 7/1997 | Wass |
| 5,743,285 A | 4/1998 | Shalkevich |
| 5,791,367 A | 8/1998 | Hackman et al. |
| 5,941,269 A | 8/1999 | Ingle |
| 6,112,760 A | 9/2000 | Scott et al. |
| 6,125,872 A | 10/2000 | Cunkelman et al. |

* cited by examiner

PRESSURE RELIEF DEVICE

This application is a continuation of PCT/CA02/00372 filed Mar. 20, 2002 which is claiming benefit of Provisional application Ser. No. 60/312,466 filed Sep. 7, 2001.

FIELD OF THE INVENTION

The present invention relates to a relief device which may be either thermally or pressure actuated to relieve pressure in pressurized containers when a pre-determined temperature or pressure in or around the container is exceeded.

BACKGROUND OF THE INVENTION

Most vehicles or containers containing a gas or liquid under pressure are equipped with relief valves to prevent catastrophic rupture of the vessels in the case of excessive pressures or temperatures. For example, vehicles using alternative fuels such as compressed natural gas require the presence of one or more fuel cylinders onboard containing such gas under pressure. Federally mandated regulations require that such cylinders be equipped with relief valving mechanism which, in the event of a fire, will allow the gas to escape from the cylinder before reaching an unacceptably high pressure. This reduces the potential for an explosion.

Several approaches have been used to produce acceptable thermally-actuated pressure relief valves. For example, one approach has been to incorporate the fusible plug of an eutectic metal that blocks and seals an outlet passage in the pressure vessel. An example of such an approach is taught in U.S. Pat. Nos. 4,744,382 and 4,744,383. In another approach, a fusible plug of a eutectic material is provided to interfere with movement of a valve member. Upon melting of the plug member, the valve member is released, unsealing a flow path to vent pressurized gases from a pressurized container. An example of such an approach is described in U.S. Pat. No. 5,632,297.

However, these known devices typically require relatively large amounts of eutectic material. Further, the fusible plugs of these devices are typically enclosed in a metal housing, thereby insulating the fusible plug from the surrounding environment, and delaying its desired response.

SUMMARY OF THE INVENTION

A pressure relief device comprising a body including an exterior surface, a cavity, an inlet, an outlet, and an aperture, each of the inlet, the outlet, and the aperture opening into the cavity, a temperature sensitive bonding element, and a valve, disposed within the cavity and extending through the aperture, including a sealing member and a cap, the cap being joined to the exterior of the body by the temperature sensitive bonding element, and the sealing member being configured to seal the inlet when the cap is joined to the exterior surface of the body.

A pressure relief device comprising a body including an exterior surface, a cavity, an inlet, an outlet, and an aperture, each of the inlet, the outlet, and the aperture opening into the cavity, and a valve, disposed within the cavity and extending through the aperture, including a sealing member and a temperature sensitive cap, the temperature sensitive cap being joined to the exterior of the body and configured to separate from the body above a predetermined temperature, and the sealing member being configured to seal the inlet when the temperature sensitive cap is joined to the exterior surface of the body.

A pressure relief device comprising a body including a cavity, an inlet, and an outlet, each of the inlet and the outlet opening into the cavity, a first temperature sensitive bonding element, and a valve, disposed within the cavity, including a sealing member, shaft, and a valve bonding element, the shaft including a longitudinal axis and joining the valve bonding element to the sealing member, the valve bonding element extending laterally outwards from the shaft and including a first valve bonding surface presenting a first planar surface, wherein the axis of the shaft is transverse to the first planar surface, and wherein the first valve bonding surface is joined to a first opposing surface of the body by the first temperature sensitive bonding element, wherein the first opposing surface is interposed between the first valve bonding surface and the valve seat, and wherein the sealing member is configured to seal the inlet when the valve is joined to the body.

A pressure relief device comprising a body including an exterior surface, a cavity, an inlet, and an outlet, each of the inlet and the outlet opening into the cavity, a temperature sensitive bonding element, a valve, disposed within the cavity, including a valve retainer and a sealing member, the valve retainer being coupled to the sealing member, the valve retainer being joined to the body by the temperature sensitive bonding element, and the sealing member being biassed into a sealing relationship with the inlet.

BRIEF DESCRIPTION OF THE DRAWINGS

The embodiments of the present invention are described below with reference to the accompanying drawings in which.

DETAILED DESCRIPTION

The present invention provides a pressure relief device for venting of gases from a vessel or other container in the event of unacceptably high temperature conditions in the environment immediate to the vessel.

Figure 1:
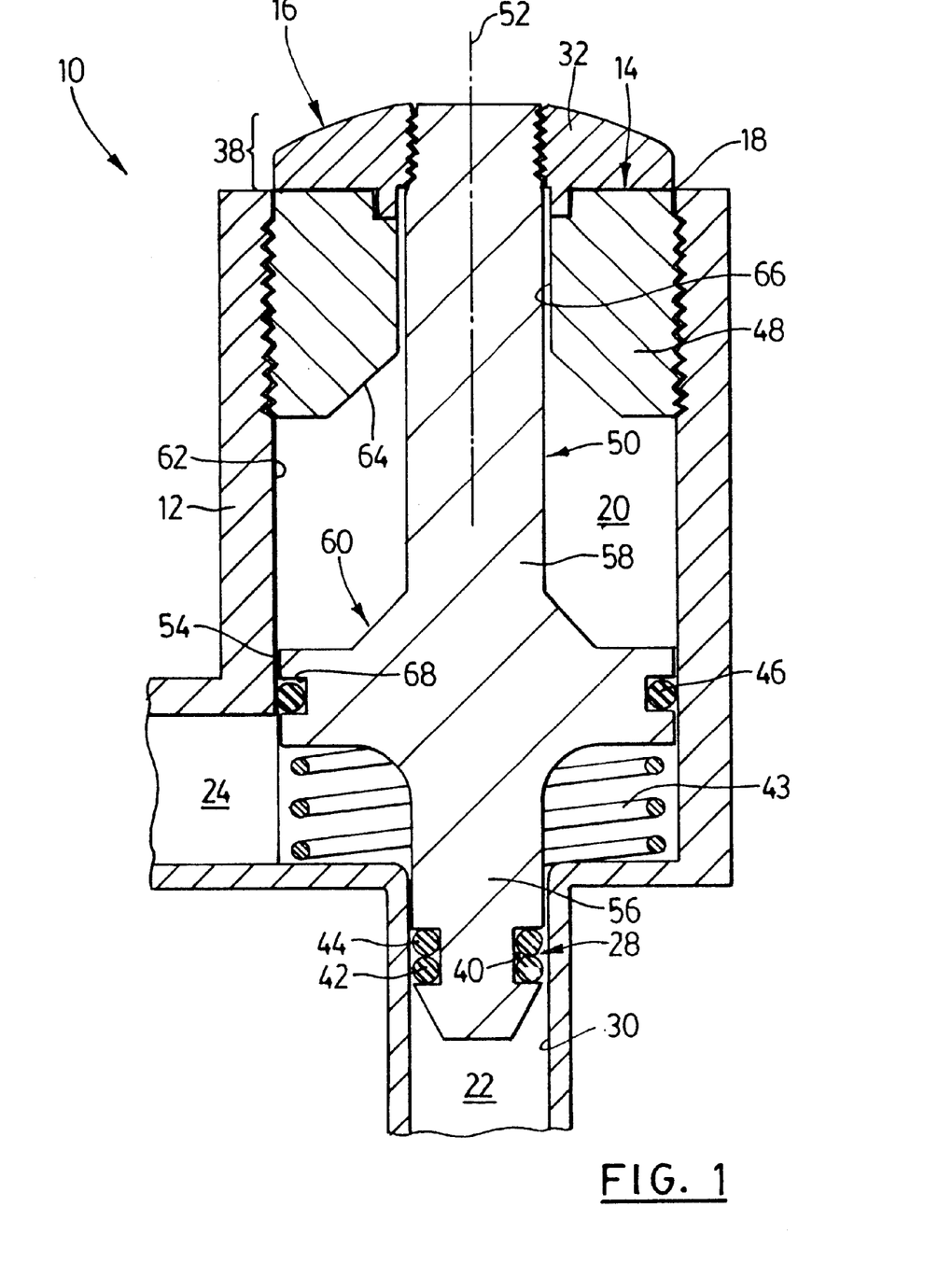
FIG. 1 is a sectional elevation view of a first embodiment of a pressure relief device of the present invention, in an unactuated condition.

Referring to FIG. 1, in one embodiment, the present invention provides a pressure relief device 10 comprising a body 12, a temperature sensitive bonding element 14, and a valve 16. The body 12 includes an exterior surface 18, a cavity 20, an inlet 22, an outlet 24, and an aperture 26. Each of the inlet 22, outlet 24, and aperture 26 open into the cavity. The valve 16 is disposed within the cavity 20 and extends through the aperture 26 and is joined to the exterior surface 18 of the body 12 by the temperature sensitive bonding element 14. The valve 16 includes a sealing member 28 configured to seal the inlet 22 from the outlet 24 by sealingly engaging a valve seat 30 provided at and defining the inlet 22, thereby preventing communication between the inlet 22 and the outlet 24, when the valve 16 is joined to the exterior surface 18 of the body 12.

The valve 16 includes a cap 32. The cap 32 is joined to the exterior surface 18 of the body 12 by the temperature sensitive bonding element 14. The cap 32 includes a valve bonding surface 34, and the valve bonding surface 34 is joined to an opposing exterior surface 36 of the body 12 by the temperature sensitive bonding element 14. The temperature sensitive element 14 is interposed between the valve bonding surface 34 and the opposing exterior surface 36 of the body 12 to thereby bond the cap 32, and therefore the valve 16, to the exterior surface 18 of the body 12. In this respect, the combination of the cap 32 and the temperature sensitive bonding element 14 functions as a temperature sensitive cap 38 which becomes unsecured relative to, or disengages from the exterior surface 18 of the body 12 above a predetermined temperature.

Figure 2:
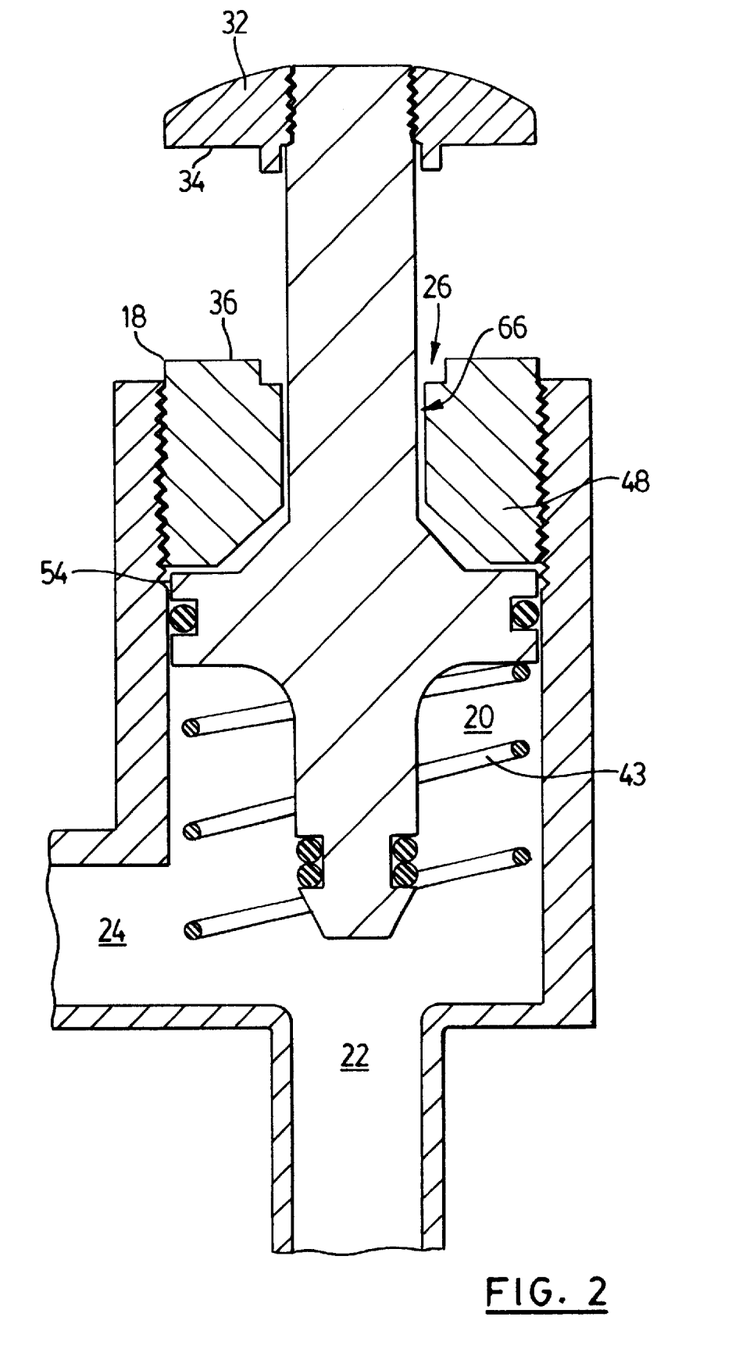
FIG. 2 is a sectional elevation view of a first embodiment of a pressure relief device of the present invention, in an actuated condition.

It is understood that the valve bonding surface 34 of the pressure relief device 10 embodiment illustrated in FIGS. 1 and 2 need not necessarily be planar. Optionally, the valve bonding surface 34 can be curved.

The temperature sensitive bonding element 14 comprises any material which forms a bond with each of the cap 32 and the body 12 below a predetermined temperature, and which undergoes physical and/or chemical changes above the predetermined temperature to cause weakening of the previously-formed bonds. For example, the temperature-sensitive bonding element 14 comprises a low melt alloy or a fusible metal with characteristics to effect bonding with the surfaces of each of the cap 32 and the body 12. As an example, and in this respect, the temperature sensitive bonding element 14 can be a solder. The temperature sensitive bonding element 14 can also comprise a polymer. The temperature sensitive bonding element 14 is provided to join the cap 32 to the body 12. In this respect, the temperature sensitive bonding element 14 includes a first surface bonded to the cap 32, and a second surface bonded to the body. Such bonding occurs under lower temperature conditions, such as ambient temperature conditions. At higher temperatures, the bonding between the temperature sensitive bonding element and each of, or either of, the cap 32 and the body 12 becomes weakened, thereby permitting the cap 32 to move away from the body 12, remotely from the inlet 22, upon application of external forces to the valve 16.

The valve 16 includes an annular groove 40 carrying the sealing member 28 including an o-ring 42 and a back-up o-ring 44. The sealing member 28 is configured to engage the valve seat 30 at the inlet 22, and thereby effect sealing of the inlet 22, and prevent communication between the inlet 22 and the outlet 24, except under abnormal operating conditions (i.e., undesirably high temperature conditions, when joinder between the cap 32 and the body 12 by the temperature sensitive bonding element 14 is weakened, and subsequently severed).

A resilient member 43 such as a spring, can be provided and configured to bias the valve 16 and its sealing member 28 away from the valve seat 30 (i.e., the resilient member 43 biases the valve 16 towards an unseated position in relation to the valve seat 30). In this respect, the resilient member 43 assists unseating of the valve 16 from the valve seat 30 when the cap 32 has become disengaged from the body 12, which is particularly helpful in the event of low pressure conditions in the associated vessel or container.

The valve 16 is disposed within the cavity 20 and moveable within the cavity 20 upon disengagement of the cap 32 from the exterior surface 18 of the body 12. Preferably, the valve 16 is sealingly disposed within the cavity 20 to prevent communication between the aperture 26 and either of the inlet 22 or the outlet 24. In this respect, the valve 16 is sealingly disposed within the cavity 20 between (i) the inlet 22 and the outlet 24, and (ii) the aperture 26. To effect this, the valve 16 includes a sealing member 46 disposed between (i) the inlet 22 and the outlet 24, and (ii) the aperture 26. Such sealing disposition of the valve 16 within the cavity 20 ensures venting of gases from the inlet 22 to the outlet 24 and then to a controlled location.

Preferably, the body 12 includes a retainer 48 or abutment configured to prevent the valve 16 from separating from the body 12, once the cap 32 disengages from the exterior surface 18 of the body 12. Without such a retainer 48 or abutment, the valve 46 is free to be expelled from the aperture 26 by combined pressure and spring forces, and become a potentially dangerous projectile.

As an example, the retainer 48 is disposed within the cavity 20 and functions as an abutment to physically engage the valve 16 and thereby limit movement of the valve 16 away from the valve seat 30. In this respect, the valve 16 includes a shaft 50 including a longitudinal axis 52. The valve 16 is substantially moveable along the longitudinal axis 52 (the valve is either closely spaced apart from the cavity, or is sealingly disposed within the cavity). The shaft 50 is interposed between and joins the sealing member 28 to the cap 32. The shaft 50 includes a radially enlarged section 54 and first and second sections 56, 58 extending in opposite directions from the radially enlarged section 54. The first section 56 extends from the radially enlarged section to the sealing surface 28. The second section 58 extends from the radially enlarged section 54 to the cap 32. The radially enlarged section 54 includes an operative surface 60 which extends further radially outwards from the longitudinal axis 52 relative to the second section 58. The retainer 48 extends from a cavity wall 62 and presents a retainer abutment surface 64 including a transverse axis which is transverse to the operative surface 60 and is configured to interfere with and limit movement of the operative surface 60. The retainer 48 further includes a passage 66 within which the second section 58 of the shaft 50 is disposed and extends through to join the cap 32. The retainer passage 66 is configured to permit unobstructed movement of the second section 58 of the shaft 50 therethrough. To effect sealing disposition of the valve 16 within the cavity 20, the radially enlarged section 54 includes an annular groove 68 carrying the sealing member 46, such as an o-ring. The o-ring sealingly engages the cavity wall 62, thereby preventing communication between the aperture 26 and each of the inlet 22 and the outlet 24.

Optionally, the resilient member 43 is interposed within the cavity 20 and supported between the radially enlarged section 54 and the valve seat 30 (a shoulder surface provided in the cavity), to thereby urge the valve 16 away from the valve seat 30.

FIGS. 1 and 2 illustrate an embodiment of the pressure relief device 10 of the present invention in two conditions. FIG. 1 illustrates the pressure relief device 10 in an unactuated condition. FIG. 2 illustrates the pressure relief device 10 in an actuated condition.

Referring to FIG. 1, in the unactuated condition, the cap 32 is joined to the exterior surface 18 of the body 12, and the sealing member 28 engages the valve seat 30 and thereby seals the inlet 22 from the outlet 24. The second section 58 of the valve shaft 50 extends through the passage 66 provided in the retainer 48, and the radially enlarged section 54 of the valve shaft 50 is spaced from the retainer 48.

When temperature conditions become undesirably high, bonding between the temperature sensitive bonding element 14 and each of, or either of, the cap 32 and the exterior surface 18 of the body 12 weakens. As a result, the combined forces of the resilient member 43, and those attributable to gaseous pressures at the inlet 22, act upon the valve 16. These forces are translated to the cap 32, and eventually sever the bonds between the temperature sensitive bonding element 14 and each of, or either of, the cap 32 and the exterior surface 18 of the body 12. Once such bonds are severed, unseating of the sealing surface 28 from the valve seat 30 by the same above-described forces is made possible.

Referring to FIG. 2, the pressure relief device 10 has become actuated upon unseating of the sealing member 28 from the valve seat 30. Unseating of the sealing member 28 from the valve seat 30 unseals the inlet 22, thereby effecting communication between the inlet 22 and the outlet 24. Communication between the inlet 22 and the outlet 24 facilitates pressure relief from the inlet 22 and any associated upstream vessel or container. Unseating of the sealing member 28 also necessarily entails movement of the sealing member 28, and therefore the valve 16, away from the valve seat 30. In this respect, upon actuation, the valve 16 moves through the cavity 50 until the radially enlarged section 54 becomes physically engaged to the retainer 48. Once engaged to the retainer 48, further movement of the sealing member 28, and therefore the valve 10, away from the valve seat 30 is prevented.

Figure 3:
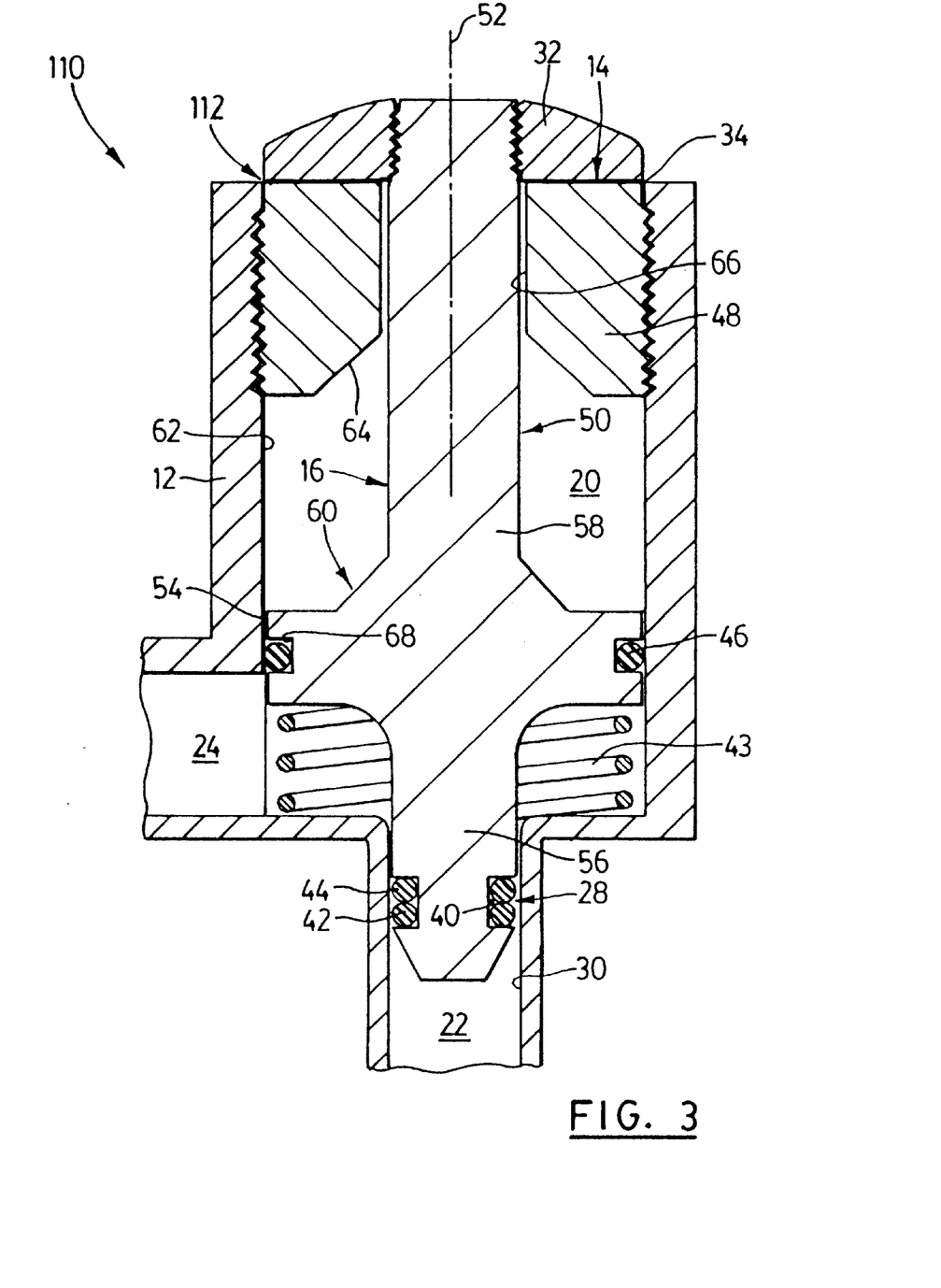
FIG. 3 is a sectional elevation view of a second embodiment of a pressure relief device of the present invention, in an unactuated condition.
Figure 4:
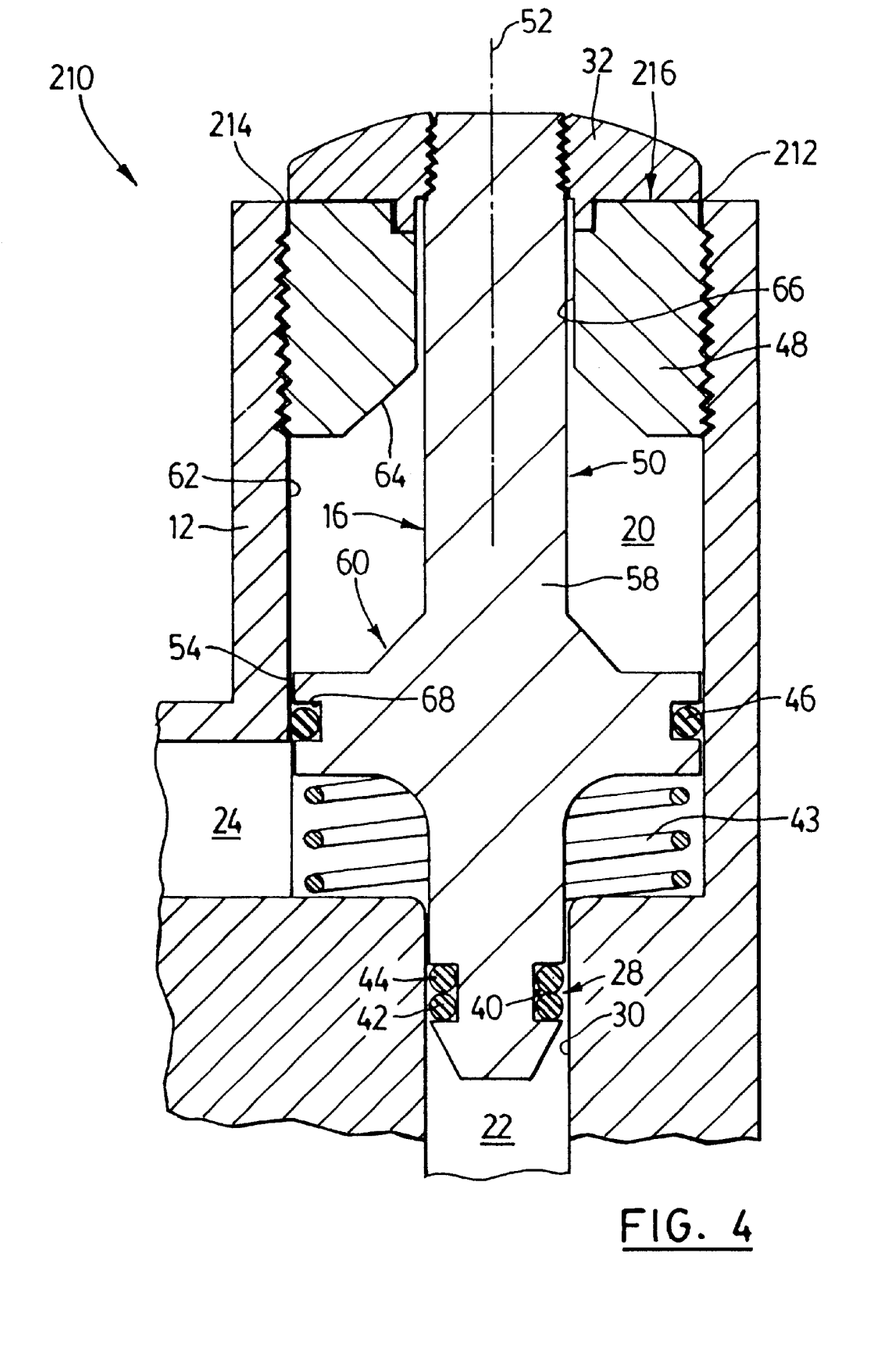
FIG. 4 is a third embodiment of a pressure relief device of the present invention, in an unactuated condition.
Figure 5:
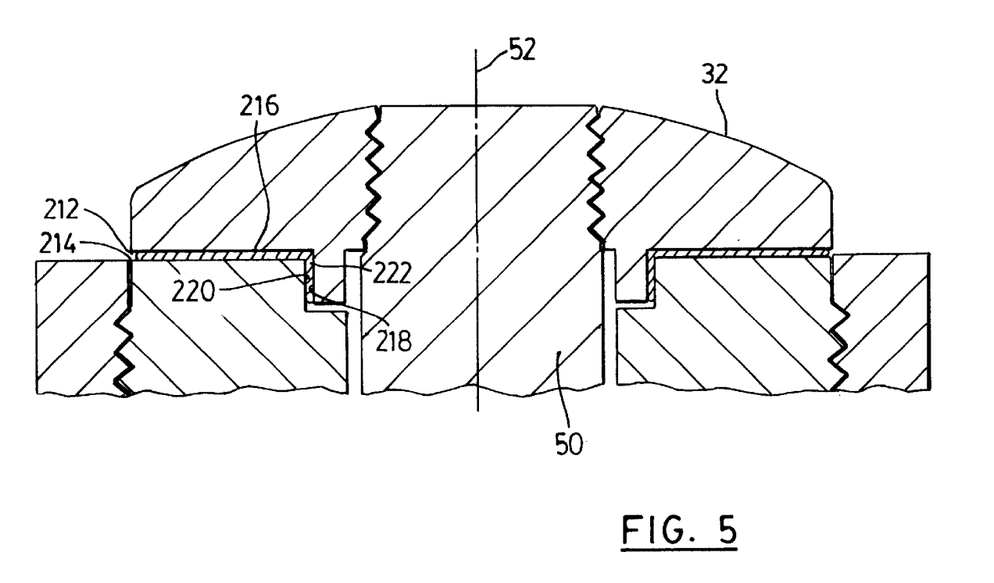
FIG. 5 is a detailed sectional elevation view of a cap of the embodiment of the pressure relief device illustrated in FIG. 4.

FIGS. 3, 4 and 5 illustrate further embodiments 110, 210 of the pressure relief device of the present invention, similar to the embodiment illustrated in FIGS. 1 and 2. Like reference numerals refer to like elements. The bonding arrangements illustrated in the FIGS. 3,4 and 5 embodiments can be optionally applied to the FIG. 1 and 2 embodiment.

Referring to FIG. 3, the pressure relief device 110 in the FIG. 3 embodiment is similar to the embodiment of the pressure relief device 10 in FIGS. 1 and 2 with the exception of the nature of the bonding arrangement of the cap 32 to the body 12. In the FIG. 3 embodiment, the valve bonding surface 34 of the cap 32 presents a planar surface such that the longitudinal axis 52 of the shaft 50 is transverse to the planar surface. As an example, the longitudinal axis 52 is perpendicular, or substantially perpendicular, to the planar surface presented by the valve bonding surface 34. The planar surface is joined to an opposing surface 112 of the body 12 by the temperature sensitive bonding element 14, wherein the opposing surface 112 is interposed between the valve bonding surface 34 and the valve seat 30. Such bonding creates a relatively strong tensile bond between the cap 32 and the body 12, as opposed to a bond which is in shear, as would be the case if the valve 16 was bonded to the body 12 along a plane parallel to the axis 52 of the shaft 50.

Referring to FIGS. 4 and 5, the pressure relief device 210 in the FIG. 4 embodiment is similar to the pressure relief devices 10, 110 in the FIGS. 1 and 2 embodiment and the FIG. 3 embodiment, with the exception of the nature of the bonding arrangement of the cap 32 to the body 12. The pressure relief device 210 of the FIG. 4 embodiment includes a cap 32 with a first valve bonding surface 212 which presents a planar surface such that the longitudinal axis 52 of the shaft 55 is transverse to the planar surface. For example, the longitudinal axis 52 is perpendicular, or substantially perpendicular, to the planar surface presented by the first valve bonding surface 212. The planar surface is joined to an opposing first bonding surface 214 of the body 12 by a first temperature sensitive bonding element 216, wherein the first bonding surface 214 is interposed between the first valve bonding surface 212 and the valve seat 30. Further, the shaft 50 of the valve 16 presents a second valve bonding surface 218 presenting a planar surface joined to an opposing second bonding surface 220 within the cavity of the body by a second temperature sensitive bonding element. 222. The second valve bonding surface 218 includes a transverse axis which is transverse to the planar surface of the first valve bonding surface 212. By joining the shaft 50 to the body 12, peeling of the cap 32 from the body 12 is mitigated. Even when unactuated, the shaft 50 of the valve 16 is subject to pressure and spring forces which act on the cap 16 in a direction which urges the cap 32 to separate from the body 12. Such forces could potentially weaken and compromise the bonding between the temperature sensitive element 14 and each of, or either of, the cap 32 and the body 12. The bonding which would initially be weakened would be that nearest to the shaft 50. To mitigate weakening, and subsequent peeling of this bonding, the shaft 50 is bonded to the body 12 to further distribute the forces being applied by the shaft 50.

Figure 6:
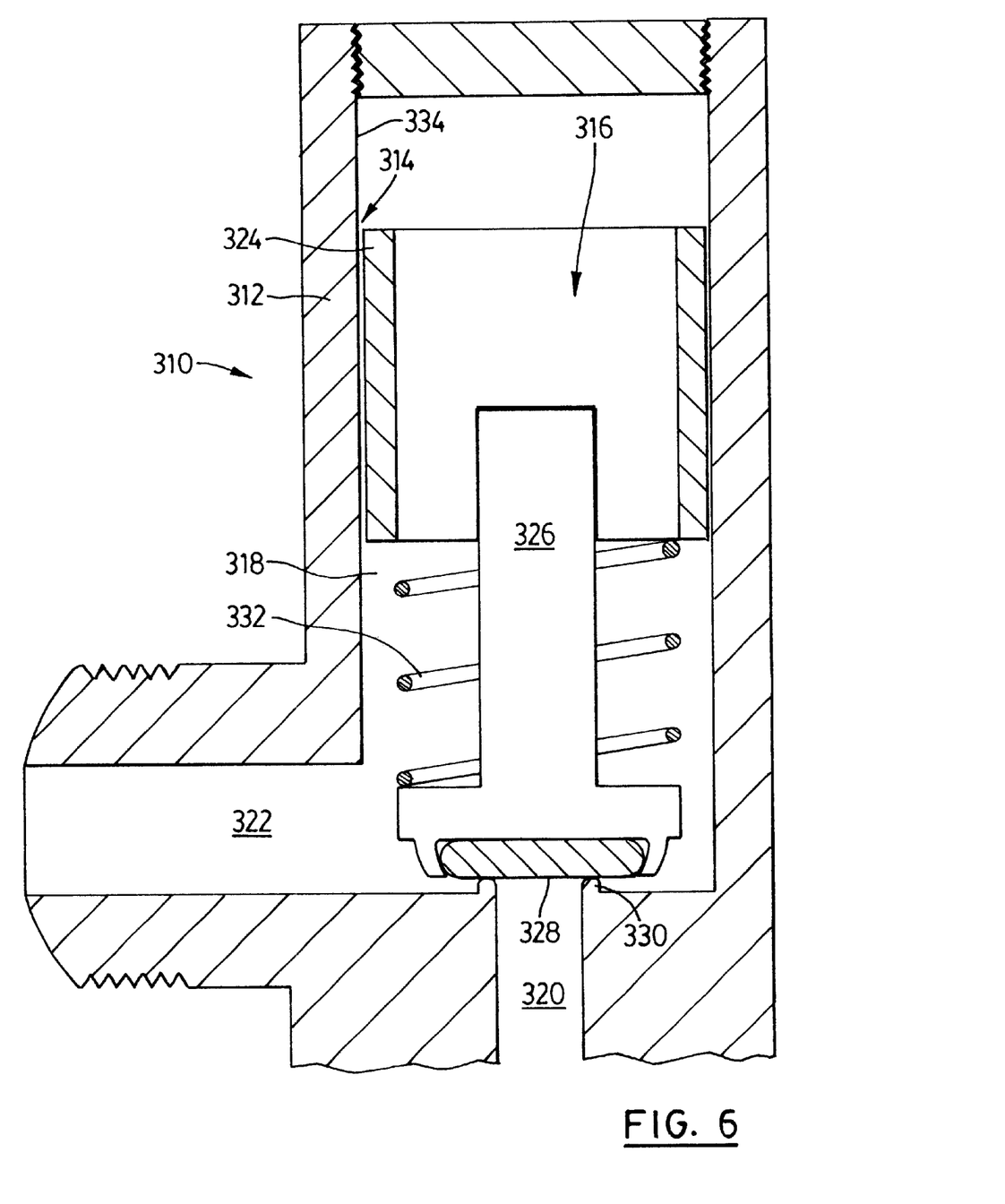
FIG. 6 is a sectional elevation view of a fourth embodiment of a pressure relief device of the present invention, in an unactuated condition.
Figure 7:
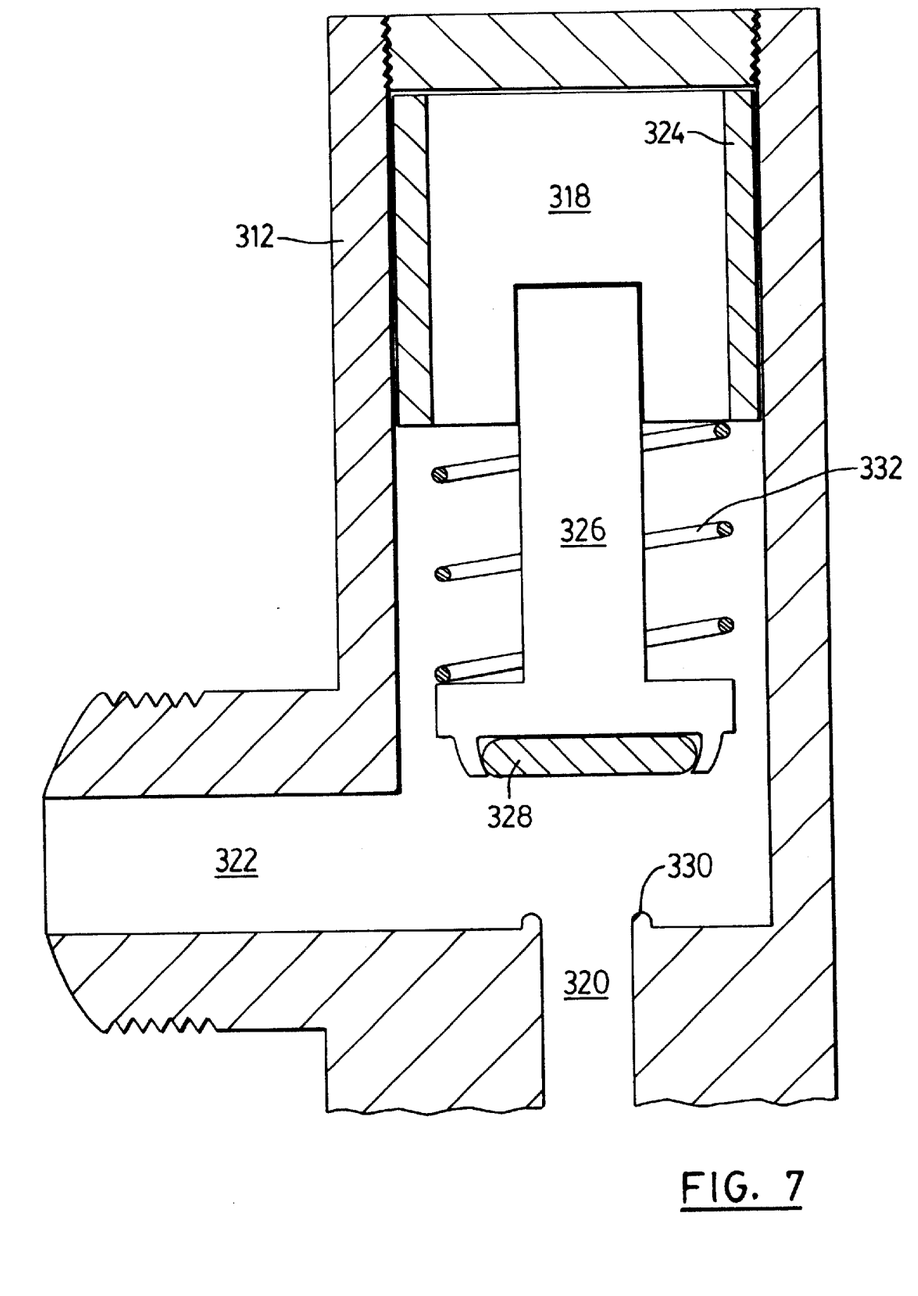
FIG. 7 is a fourth embodiment of a pressure relief device of the present invention, in a temperature actuated condition.
Figure 8:
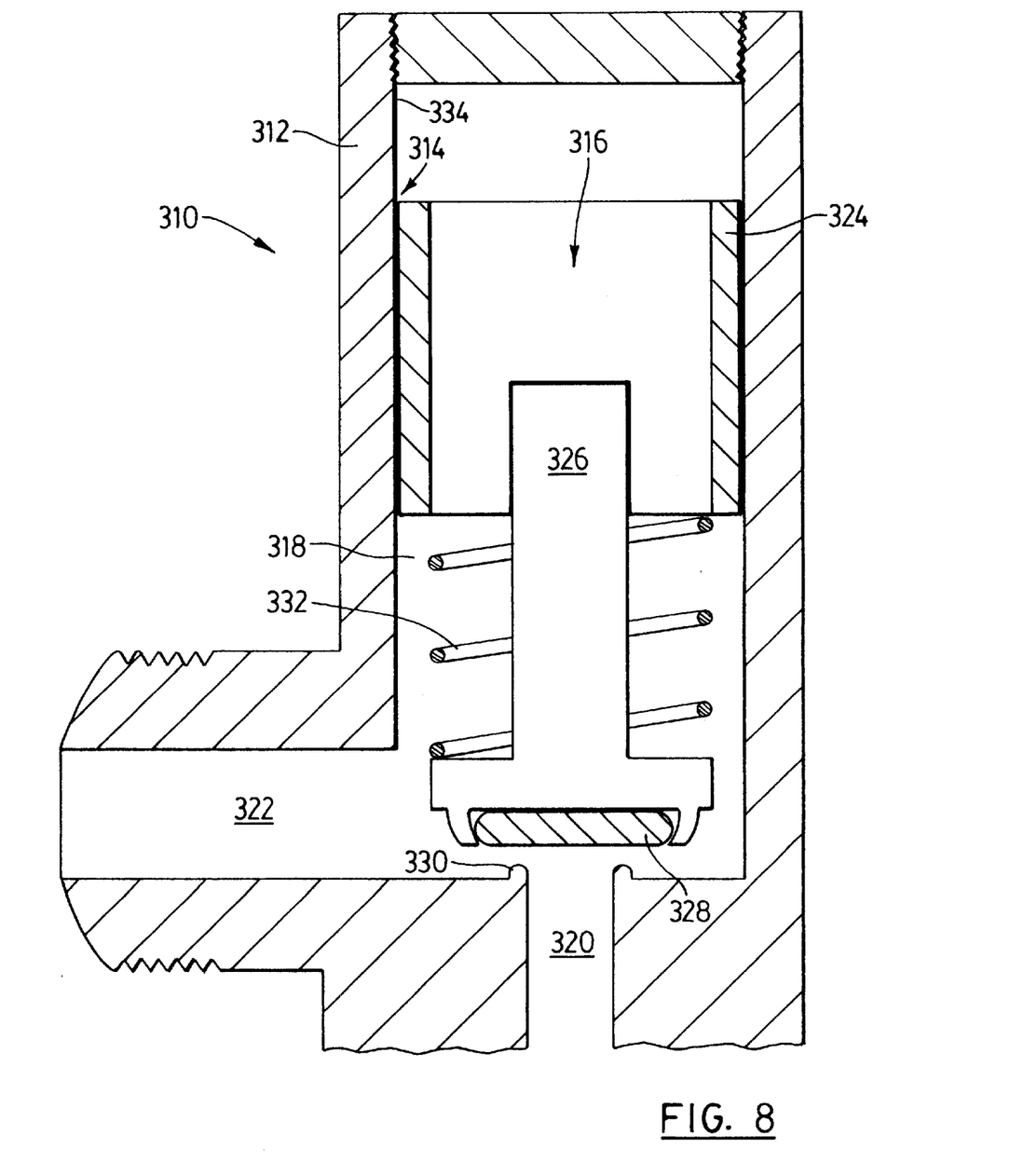
FIG. 8 is a sectional elevation view of a fourth embodiment of a pressure relief device of the present invention, in a pressure actuated condition.

FIGS. 6, 7 and 8 illustrate a further embodiment of the pressure relief device of the present invention in unactuated (FIG. 6) temperature actuated (FIG. 7), and pressure actuated (FIG. 8) conditions. The pressure relief device in the FIGS. 6, 7 and 8 embodiment is configured for actuation by either high temperature or high pressure conditions.

In this respect, referring to FIG. 6, a pressure relief device 310 is provided comprising a body 312, a temperature sensitive bonding element 314, and a valve 316. The body 312 includes a cavity 318, an inlet 320, an outlet 322, wherein each of the inlet 320 and the outlet 322 opens into the cavity 318. The valve 316 is disposed within the cavity 318 and includes a valve retainer 324 and a piston 326. The valve retainer 324 is joined to the body 312 by the temperature sensitive bonding element 314. The piston 326 includes a sealing member 328 configured to engage a valve seat 330 provided at, and defining, the inlet 320, thereby sealing the inlet 320 from communication with the outlet 322, when the retainer 324 is joined to the body 312. The valve 316 also includes a resilient member 332, such as a spring, interposed between, supported by, and coupled to each of the piston 326 and the valve retainer 324. In this respect, the piston 326 is biased or urged into sealing engagement with the valve seat 330 while also being coupled to the valve retainer 324. The resilient member 332 also biases or urges the valve retainer 324 away from the valve seat 322.

The piston 326 carries the sealing member 328. The sealing member 328 is configured to engage the valve seat 330 at the inlet 320, and thereby effect sealing of the inlet 320, and prevent communication between the inlet 320 and the outlet 322, except under abnormal operating conditions (ie. undesirably high temperature conditions, when joinder between the valve retainer 324 and the body 312 by the temperature sensitive bonding element 314 is weakened, and subsequently severed, or high pressure conditions which effect unseating of the piston 326 from the valve seat 330).

The temperature sensitive bonding element 314 comprises any material which forms a bond with each of the cap and the body below a predetermined temperature, and which undergoes physical and/or chemical changes above the predetermined temperature to cause weakening of the previously-formed bonds. For example, the temperature-sensitive bonding element comprises a low melt alloy or a fusible metal with characteristics to effect bonding with the surfaces of each of the valve retainer 324 and the body 312. For example, the temperature-sensitive bonding element 314 comprises solder. The temperature-sensitive bonding element 314 can also comprise a polymer. The temperature sensitive bonding element 314 is provided to join the valve retainer 324 to the body 312. In this respect, the temperature sensitive bonding element 314 includes a first surface bonded to the valve retainer 324, and a second surface bonded to the body 312. Such bonding occurs under lower temperature conditions, such as ambient temperature conditions. At higher temperatures, the bonding between the temperature sensitive bonding element and each of, or either of, the valve retainer 324 and the body 312 becomes weakened, thereby permitting the valve retainer 324 to move away from the body 312, remotely from the inlet, upon application of external forces to the valve 324.

The valve 316 is disposed within the cavity 318. Particularly, the valve retainer 324 is joined to the wall 334 of the cavity 318. The cavity 318 is configured with sufficient space to receive and retain the valve 316 once actuated in the manner described below. As one example, the valve retainer 324 comprises an axially extending collar, which is joined along its length to the wall 334 of the cavity 318 by the temperature sensitive bonding element 314 interposed therebetween.

Referring to FIG. 7, when the temperature exceeds a predetermined maximum value, bonding between the temperature sensitive bonding element 314 and each of, or either of, the retainer 324 and the body 312 weakens. As a result, the combined forces of the resilient member 332, and those attributable to gaseous pressure at the inlet 320, act upon the retainer 324 through the piston 326 and the resilient member 332, and eventually sever the bonds between the temperature sensitive bonding element 314 and each of, or either of, the retainer 324 and the body 312. Once such bonds are severed, support of the resilient member 332 by the valve retainer 324 is substantially compromised such that forces biasing the piston 326 and its sealing surface 328 to remain seated against the valve seat 330 are significantly, if not substantially, removed. Gaseous forces are permitted to act substantially unopposed against the sealing surface 328, thereby cause unseating of the sealing surface 328 from the valve seat 330. As a result, communication between the inlet 320 and outlet 322 is effected, facilitating pressure relief from the inlet 320 and associated vessel or container.

Similarly, when pressure at the inlet 320 exceeds a predetermined maximum value, the pressure relief device 310 can also be actuated (see FIG. 8). At the predetermined maximum value, the pre-set compressive forces exerted by the resilient member 332 will be exceeded by the pressure at the inlet 320. The increased pressure will unseat the piston 326 and cause opening of the inlet 320. As a result, communication between the inlet 320 and outlet 322 will be effected, thereby facilitating pressure relief from the inlet 320 (and associated vessel or container).

Unlike the case of actuation of the pressure relief device 310 in response to undesirably high temperature conditions, the removal of the abnormal pressure conditions at the inlet 320 will permit the piston 324 to return to a seated position against the valve seat 330, thereby permitting re-use of the pressure relief device 310. When the pressure relief device 310 is actuated by undesirably high pressure conditions, gases will flow from the inlet 320 to the outlet 322, and gas pressure will be reduced at the inlet 320 as gaseous inventory in the associated vessel or container becomes depleted. Once the gas pressure at the inlet 320 is reduced, below the predetermined maximum pressure, the compressive forces of the resilient member 332 will again be sufficient to cause the piston 326 and its sealing member 328 to sealingly engage the valve seat 330 and seal the inlet 320.

Figure 9:
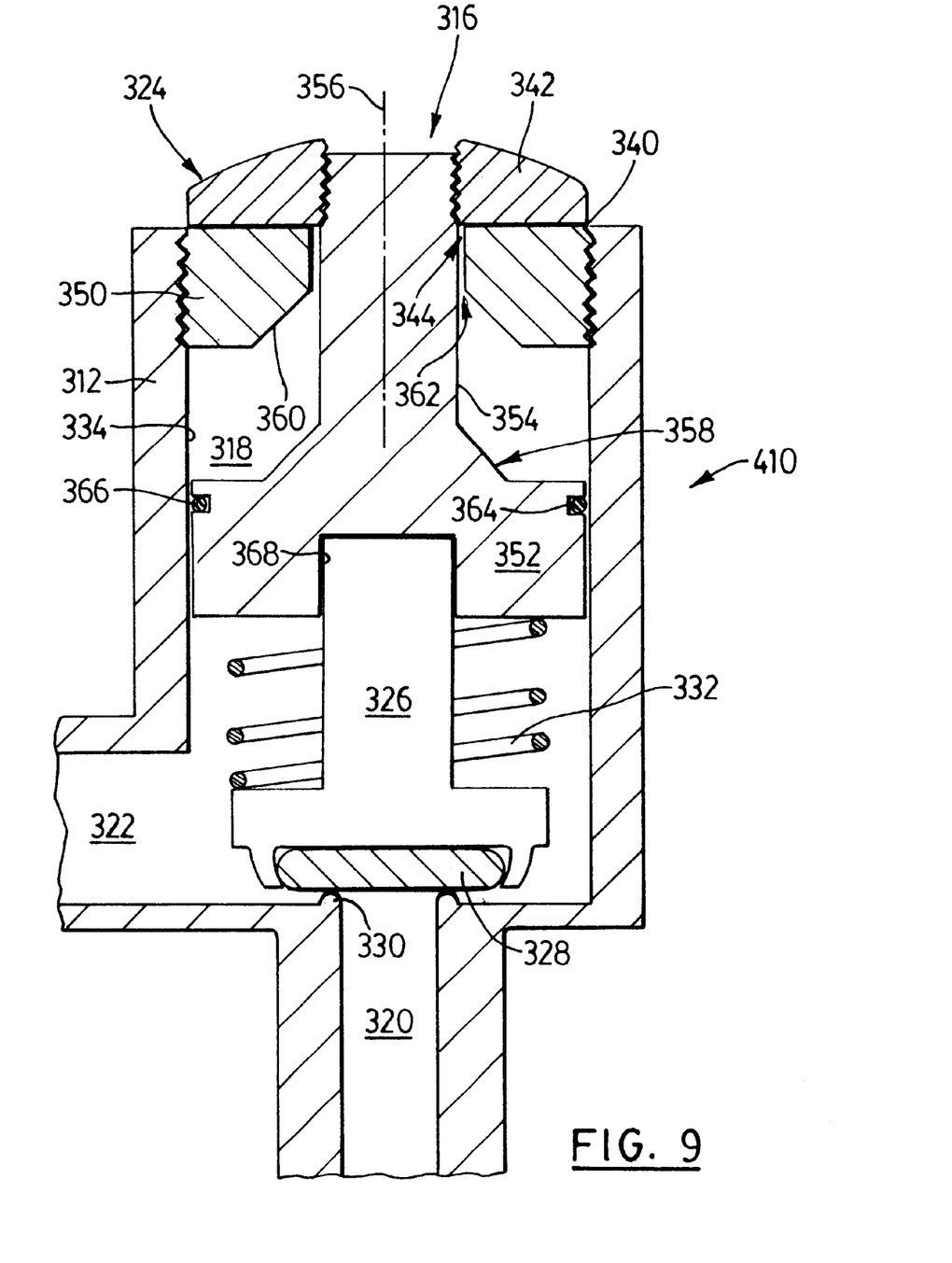
FIG. 9 is a sectional elevation view of a fifth embodiment of a pressure relief device of the present invention, in an unactuated condition.
Figure 10:
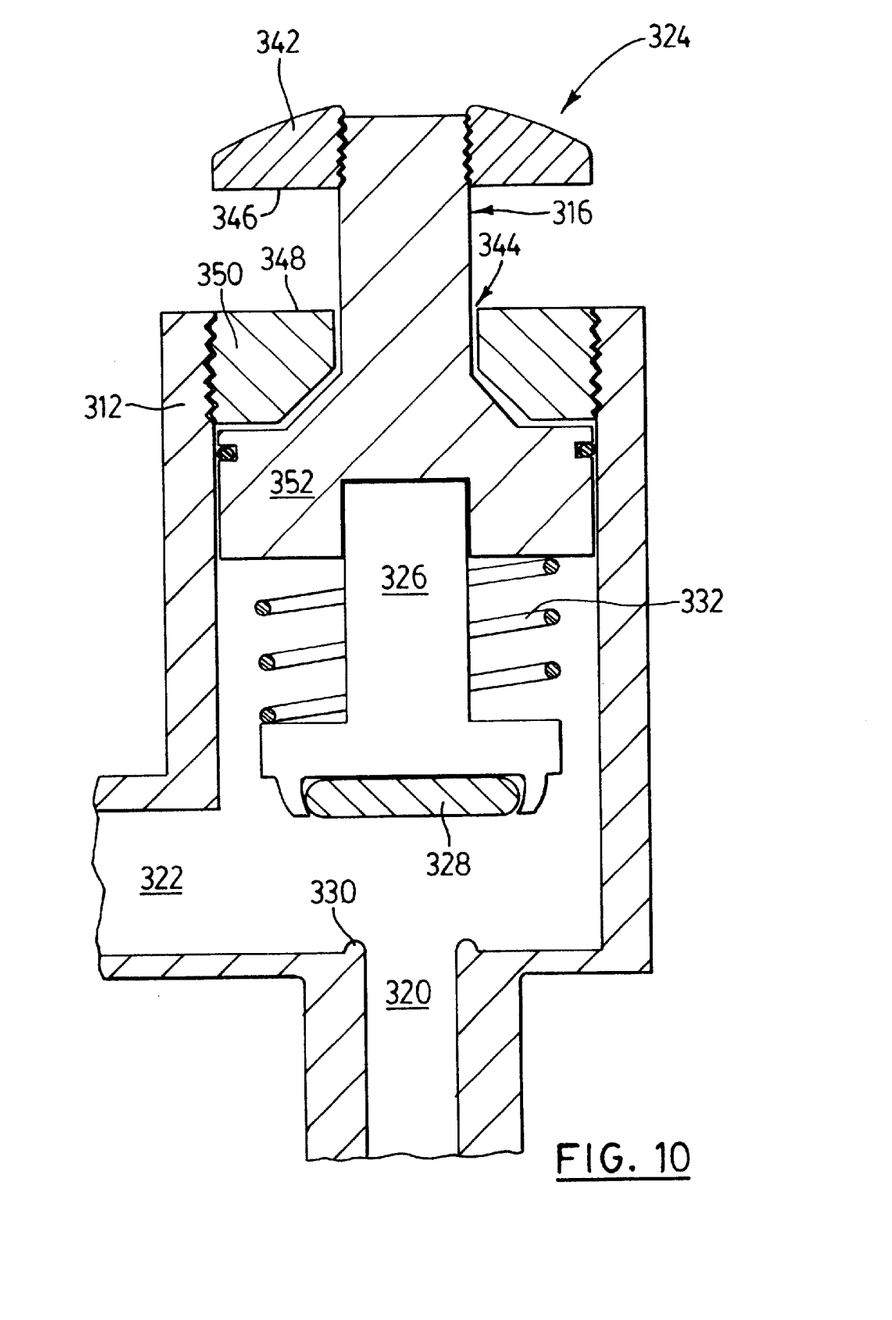
FIG. 10 is a fifth embodiment of a pressure relief device of the present invention, in a temperature actuated condition.
Figure 11:
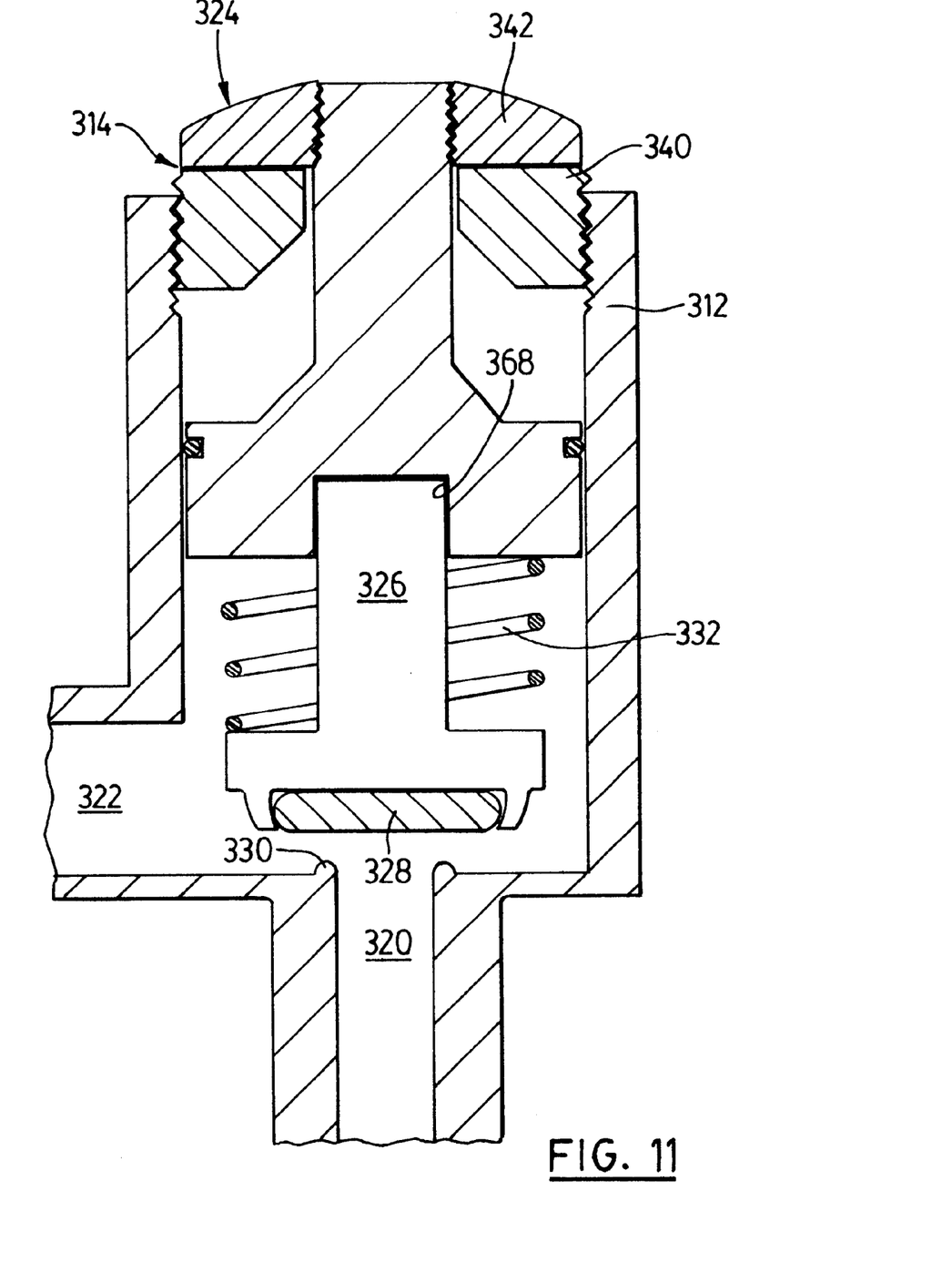
FIG. 11 is a sectional elevation view of a fifth embodiment of a pressure relief device of the present invention in a pressure actuated condition.

FIGS. 9, 10, and 11 illustrate a further embodiment of the pressure relief device of the present invention, similar to the embodiment illustrated in FIGS. 6, 7, and 8. Like reference numerals refer to like elements.

The pressure relief device 410 in the FIGS. 9, 10, and 11 embodiment is similar to the embodiment of the pressure relief device in FIGS. 6, 7, and 8 with the exception of the nature of the bonding arrangement of the retainer 324 to the body 312. In the FIGS. 9, 10 and 11 embodiment, the valve 316 includes a valve retainer 324 which is joined to the exterior surface 340 of the body 312. In this respect, the valve retainer 324 includes a cap 342. The cap 342 is joined to the exterior surface 340 of the body 312 with a temperature sensitive bonding element 314. The bonding arrangement illustrated in the FIGS. 3 and 4 embodiments can be optionally applied to the FIGS. 9, 10, and 11 embodiment.

Referring to FIG. 9, the body 312 further includes an aperture 344 defined by the exterior surface 340 of the body 312. The valve 316 extends through the aperture 344 such that the cap 342 is joined to the exterior surface 340 by the temperature sensitive bonding element 314. In this respect, the cap 342 includes a valve bonding surface 346, and the valve bonding surface 346 is joined to an opposing exterior surface 348 of the body 312 by the temperature sensitive bonding element 314. The temperature sensitive element 314 is interposed between the valve bonding surface 346 and the opposing exterior surface 348 of the body 312 to thereby bond the cap 342, and therefore the valve 316, to the exterior surface 340 of the body 312.

The valve 316 is disposed within the cavity 318 and moveable within the cavity 318 upon disengagement of the cap 342 from the exterior surface 340 of the body 312. Preferably, the valve 316 is sealingly disposed within the cavity 318 to prevent communication between the aperture 344 and either of the inlet 320 or the outlet 322. In this respect, the valve 316 is sealingly disposed within the cavity 318 between (i) the inlet 320 and the outlet 322, and (ii) the aperture 326. To effect this, the valve 316 includes a sealing member 328 disposed between (i) the inlet 320 and the outlet 322, and (ii) the aperture 326. Such sealing disposition of the valve 316 within the cavity 318 ensures venting of gases from the inlet 320 to the outlet 322 and then to a controlled location.

The body 312 includes a body abutment 350 configured to prevent the valve 316, and particularly the valve retainer 324, from separating from the body 312, once the cap 342 disengages from the exterior surface 340 of the body 312. Without such an abutment 350, the valve 316, or at least the valve retainer 324, is free to be expelled from the opening by combined pressure and spring forces, and become a potentially dangerous projectile.

For example, the body abutment 350 is disposed within the cavity 318 and functions to physically engage the valve 316 and thereby limit movement of the valve 316 away from the valve seat 330. In this respect, the valve retainer 324 includes a radially enlarged section 352 and a shaft 354. The shaft 354 extends from the radially enlarged section 352 and joins the cap 342 to the radially enlarged section 352. The shaft 354 includes a longitudinal axis 356. The valve 316 is substantially moveable along the longitudinal axis 356 (the valve 316 is either closely spaced apart from the wall 334 of the cavity 318, or is sealingly disposed within the cavity 318, throughout its distance of travel). The radially enlarged section 352 includes an operative surface 358 which extends further radially outwards from the longitudinal axis 356 relative to the shaft section 354. The abutment 350 extends from the cavity wall 334 and presents an abutment surface 360 including a transverse axis which is transverse to the operative surface 358 and is configured to interfere with and limit movement of the operative surface 358. The abutment 350 further includes a passage 362 within which the shaft 354 of the valve retainer 324 is disposed and extends through to join the cap 342. The passage 362 is configured to permit unobstructed movement of the shaft 354 of the valve retainer 324 therethrough.

To effect sealing disposition of the valve 316 within the cavity 318, the radially enlarged section 352 includes an annular groove 364 carrying a sealing member 366, such as an o-ring. The o-ring sealingly engages the cavity wall 334, thereby preventing communication between the aperture 344 and each of the inlet 320 and the outlet 322.

Optionally, the resilient member 332 is interposed between, coupled to, and supported by each of the radially enlarged section 352 of the valve retainer 324 and the piston 326.

The valve retainer also includes a recess 368 for receiving the piston 326 when the piston 326 becomes unseated from the valve seat 330 during high pressure conditions, as described below. The recess 368 is axially aligned with the piston 324. In the embodiment illustrated, the recess 368 is provided in the radially enlarged section 352 of the valve retainer 324.

Under normal operating conditions, that is when temperature conditions in the immediate environment to that of the relief device 410 do not exceed a maximum predetermined value, and the pressure conditions at the inlet 320 (and, therefore, in the associated vessel or container) do not exceed a maximum predetermined value, the temperature sensitive bonding element 314 remains bonded to each of the cap 342 and the exterior surface 340 of the body 312. Forces exerted by the resilient member 332 upon the piston 326 are sufficient to overcome any opposing forces exerted by the gas pressure at the inlet 320. As a result, the sealing surface 328 of the piston 326 remains seated against the valve seat 330, thereby sealing the inlet 320 and preventing any communication between the inlet 320 (i.e., from the vessel or storage container) and the outlet 322.

If, however, temperature conditions exceed a maximum predetermined value (see FIG. 10), bonding between the temperature sensitive bonding element 314 and each of, or either of, the exterior surface 340 of the body 312 and the cap 342 weakens. As a result, the combined forces of the resilient member 332, and those attributable to gaseous pressures at the inlet 320, act upon the cap 342 and eventually sever the bonds between the temperature sensitive element 314 and each of, or either of, the cap 342 and the exterior surface 340 of the body 312. Once such bonds are severed, the piston 326 is forced away from the valve seat 330, thereby unsealing the inlet 320 and effecting communication between the inlet 320 and the outlet 322, and facilitating pressure relief from the inlet 320 (and corresponding vessel or container).

Likewise, if the pressure at the inlet 320 (and in the associated vessel or storage container) exceeds a predetermined maximum value, the relief device 410 will also be actuated (FIG. 10). At the predetermined maximum value, the pre-set compressive forces exerted by the resilient member 332 will be exceeded by the pressure at the inlet 320. The increased pressure will unseat the piston 326 and cause the piston 326 to move into the annular recess 368 of the valve retainer 324. As a result, communication between the inlet 320 and outlet 322 will be effected, thereby facilitating pressure relief from the inlet 320 (and corresponding vessel or container).

Unlike the case of actuation of the pressure relief device 410 in response to undesirably high temperature conditions, the removal of the abnormal pressure conditions at the inlet 320 will permit the piston 326 to return to a seated position against the valve seat 330, thereby permitting reuse of the pressure relief device 410. When the pressure relief device 410 is actuated by undesirably high temperature conditions, gases will flow from the inlet 320 to the outlet 322, and gas pressure will be reduced at the inlet 320 as gaseous inventory in the associated vessel or container becomes depleted. Once the gas pressure at the inlet 320 is sufficiently reduced, below predetermined maximum pressure, the compressive forces of the resilient member 332 will again be sufficient to cause the piston 326 and its sealing member 328 to sealingly engage the valve seat 330 and seal the inlet 320.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. A pressure relief device comprising:
    a body including an exterior surface, a cavity, an inlet, an outlet, and an aperture, each of the inlet, the outlet, and the aperture opening into the cavity;
    a temperature sensitive bonding element; and
    a valve, disposed within the cavity and extending through the aperture, including a sealing member and a cap, the cap being joined to the exterior of the body by the temperature sensitive bonding element, and the sealing member being configured to seal the inlet when the cap is joined to the exterior surface of the body.

2. A pressure relief device as claimed in claim 1, wherein the body further includes a retainer configured to prevent the valve from separating from the body when the cap becomes disengaged from the body.

3. A pressure relief device as claimed in claim 1, wherein the valve is sealingly disposed within the cavity between (i) the inlet and the outlet, and (ii) the aperture.

4. A pressure relief device as claimed in claim 3, wherein the valve includes a sealing member disposed between (i) the inlet and the outlet, and (ii) the aperture.

5. A pressure relief device as claimed in claim 2, wherein the valve is sealingly disposed within the cavity between (i) the inlet and the outlet, and (ii) the aperture.

6. A pressure relief device as claimed in claim 5, wherein the valve includes a sealing member disposed between (i) the inlet and the outlet, and (ii) the aperture.

7. A pressure relief device as claimed in claim 1, wherein the valve is biassed away from the valve seat.

8. A pressure relief device as claimed in claim 7, further comprising a resilient member disposed within the cavity and configured to urge the valve into an unsealing relationship relative to the inlet.

9. A pressure relief device as claimed in claim 8, wherein the body further includes a retainer configured to prevent the valve from separating from the body when the cap becomes disengaged from the body.

10. A pressure relief device as claimed in claim 9, wherein the valve is sealingly disposed within the cavity between (i) the inlet and the outlet, and (ii) the aperture.

11. A pressure relief device as claimed in claim 10, wherein the valve includes a sealing member disposed between (i) the inlet and the outlet, and (ii) the aperture.

12. A pressure relief device comprising:

a body including a cavity, an aperture, an inlet, and an outlet, each of the aperture, inlet, and the outlet opening into the cavity;

the body including an exterior surface positioned distal to the inlet;

a temperature sensitive bonding element adapted to melt at temperatures above a predetermined temperature;

a valve disposed at least partially within the cavity and including a sealing member;

the valve being movable between a closed position, in which the inlet and the outlet are sealed from each other by the sealing member, and an open position, in which the inlet is in fluid communication with the outlet; and the valve including at least one valve bonding surface adapted to mate with the exterior surface of the body when the valve is in the closed position, such that the temperature sensitive bonding element is receivable therebetween, to bond said at least one valve bonding surface to the exterior surface when the temperature of the temperature sensitive bonding element is below the predetermined temperature;

whereby, upon the temperature of temperature sensitive bonding material exceeding the predetermined temperature, the temperature sensitive bonding material melts, permitting disengagement of said at least one valve bonding surface from the exterior surface, such that the valve is movable from the closed position to the open position.

13. A pressure relief device as claimed in claim 12 in which the valve includes a cap portion extending outside the cavity and including said at least one valve bonding surface, and the body additionally includes a retainer configured to prevent the valve from exiting the body when the cap is disengaged from the body.

14. A pressure relief device as claimed in claim 12, wherein the valve is sealingly disposed within the cavity between (i) the inlet and the outlet, and (ii) the aperture.

15. A pressure relief device as claimed in claim 14, wherein the valve includes a sealing member disposed between (i) the inlet and the outlet, and (ii) the aperture.

16. A pressure relief device as claimed in claim 13, wherein the valve is sealingly disposed within the cavity between (i) the inlet and the outlet, and (ii) the aperture.

17. A pressure relief device as claimed in claim 16, wherein the valve includes a sealing member disposed between (i) the inlet and the outlet, and (ii) the aperture.

18. A pressure relief device as claimed in claim 12, wherein the valve is biassed away from the valve seat.

19. A pressure relief device as claimed in claim 18, further comprising a resilient member disposed within the cavity and configured to urge the valve into an unsealing relationship relative to the inlet.

20. A pressure relief device as claimed in claim 19 in which the valve includes a cap portion extending outside the cavity and including said at least one valve bonding surface, and the body additionally includes a retainer configured to prevent the valve from exiting the body when the cap disengaged from the body.

21. A pressure relief device is claimed in claim 20, wherein the valve is sealingly disposed within the cavity between (i) the inlet and the outlet, and (ii) the aperture.

22. A pressure relief device as claimed in claim 21, wherein the valve includes a sealing member disposed between (i) the inlet and the outlet, and (ii) the aperture.

* * * * *